US007819319B2

(12) United States Patent
Vernay et al.

(10) Patent No.: US 7,819,319 B2
(45) Date of Patent: Oct. 26, 2010

(54) METHOD AND SYSTEM FOR ELECTRONIC VOTING OVER A HIGH-SECURITY NETWORK

(75) Inventors: François Vernay, Grenoble (FR); Jacques Traore, Saint Georges de Groseillers (FR); Antoine Bonamour, Grenoble (FR)

(73) Assignee: France Telecom, Paris (FR)

( * ) Notice: Subject to any disclaimer, the term of this patent is extended or adjusted under 35 U.S.C. 154(b) by 767 days.

(21) Appl. No.: 11/168,367

(22) Filed: Jun. 29, 2005

(65) Prior Publication Data

US 2006/0000904 A1      Jan. 5, 2006

(30) Foreign Application Priority Data

Jun. 30, 2004    (FR)  .................................. 04 07267

(51) Int. Cl.
| | | |
|---|---|---|
| G06K 17/00 | (2006.01) | |
| G07C 13/00 | (2006.01) | |
| G06F 17/00 | (2006.01) | |
| G06F 11/00 | (2006.01) | |
| G09B 9/00 | (2006.01) | |
| G09B 19/00 | (2006.01) | |

(52) U.S. Cl. .......................... 235/386; 235/51; 235/375; 705/12; 434/306

(58) Field of Classification Search .................... 235/51, 235/375, 386; 705/12; 434/306
See application file for complete search history.

(56) References Cited

U.S. PATENT DOCUMENTS 5,495,532 A * 2/1996 Kilian et al. ................... 380/30
6,021,200 A * 2/2000 Fischer ......................... 705/74
6,081,793 A * 6/2000 Challener et al. .............. 705/50
6,092,051 A * 7/2000 Kilian et al. ................... 705/12
6,250,548 B1 * 6/2001 McClure et al. ............... 235/51
6,581,824 B1 * 6/2003 McClure et al. ............... 235/51
6,845,447 B1 * 1/2005 Fujioka et al. ............... 713/156
6,865,543 B2 * 3/2005 Gibbs, Sr. ..................... 705/12
6,873,966 B2 * 3/2005 Babbitt et al. ................. 705/12
6,973,581 B2 * 12/2005 Chung et al. .................. 726/13
7,032,821 B2 * 4/2006 McClure et al. ............. 235/386
7,036,730 B2 * 5/2006 Chung ......................... 235/386
7,163,147 B2 * 1/2007 Cummings ................. 235/386

(Continued)

OTHER PUBLICATIONS

Fujioka A et al., "A Practical Secret Voting Scheme for Large Scale Elections" Advances in Cryptology—Proceedings of the Auscrypt Workshop on the Theory and Application of Cryptographic Techniques, 1992, pp. 244-251, XP000572977 ABRèGè p. 245, Ligne 36-p. 248, Ligne 12.

*Primary Examiner*—Daniel Walsh
(74) *Attorney, Agent, or Firm*—Young & Thompson

(57) ABSTRACT

A method and system for electronic voting over a network, from a terminal (Te) connected to an administrative server (SA) and to a vote-counting server (SCV). An authentication certificate (CA) and a single-use password (UPWe) are calculated and transmitted (A) from the server (SA) to the voter (Eu), an electronic ballot paper (EB) and an anonymous reference (AREu) are transmitted (B) from the terminal (Te) to the server (SCV) and, upon verification ($B_1$) of the anonymous reference, the vote and the paper are validated ($B_3$), the paper is counted, a confirmation of receipt (ACW) and an electoral register document (DVR) are transmitted from the server (SCV) to the terminal (Te). The terminal (Te) signs the register and transmits (C) the signed register (SDVR) to the server (SA) which closes ($D_1$) the vote of the voter (Eu).

18 Claims, 6 Drawing Sheets

U.S. PATENT DOCUMENTS

| | | | |
|---|---|---|---|
| 7,237,717 B1* | 7/2007 | Rao et al. | 235/386 |
| 7,260,552 B2* | 8/2007 | Riera Jorba et al. | 705/12 |
| 7,360,094 B2* | 4/2008 | Neff | 713/179 |
| 7,360,702 B2* | 4/2008 | Haas | 235/386 |
| 7,366,799 B2* | 4/2008 | Reddy et al. | 710/11 |
| 2001/0042005 A1* | 11/2001 | McClure et al. | 705/12 |
| 2002/0007457 A1* | 1/2002 | Neff | 713/180 |
| 2002/0019767 A1* | 2/2002 | Babbitt et al. | 705/12 |
| 2002/0074399 A1* | 6/2002 | Hall et al. | 235/386 |
| 2002/0077885 A1* | 6/2002 | Karro et al. | 705/12 |
| 2002/0077886 A1* | 6/2002 | Chung | 705/12 |
| 2002/0077887 A1* | 6/2002 | London Shrader et al. | 705/12 |
| 2002/0082907 A1* | 6/2002 | Inomata et al. | 705/12 |
| 2002/0083126 A1* | 6/2002 | Best et al. | 709/203 |
| 2002/0107724 A1* | 8/2002 | Openshaw et al. | 705/12 |
| 2002/0128901 A1* | 9/2002 | Gibbs, Sr. | 705/12 |
| 2002/0133396 A1* | 9/2002 | Barnhart | 705/12 |
| 2002/0138341 A1* | 9/2002 | Rodriguez et al. | 705/12 |
| 2002/0143901 A1* | 10/2002 | Lupo et al. | 709/219 |
| 2002/0194060 A1* | 12/2002 | Chernomorov | 705/12 |
| 2003/0006282 A1* | 1/2003 | Vadura et al. | 235/386 |
| 2003/0042305 A1* | 3/2003 | Jacobs et al. | 235/386 |
| 2003/0046144 A1* | 3/2003 | Clark et al. | 705/12 |
| 2003/0047604 A1* | 3/2003 | McClure et al. | 235/386 |
| 2003/0060910 A1* | 3/2003 | Williams et al. | 700/91 |
| 2003/0094489 A1* | 5/2003 | Wald | 235/386 |
| 2003/0136835 A1* | 7/2003 | Chung et al. | 235/386 |
| 2003/0149616 A1* | 8/2003 | Travaille | 705/12 |
| 2003/0154405 A1* | 8/2003 | Harrison | 713/201 |
| 2003/0178484 A1* | 9/2003 | Vadura et al. | 235/386 |
| 2003/0195798 A1* | 10/2003 | Goci | 705/11 |
| 2003/0208395 A1* | 11/2003 | McClure et al. | 705/12 |
| 2003/0227643 A1* | 12/2003 | Reddy et al. | 358/1.13 |
| 2004/0023690 A1* | 2/2004 | Kamiya et al. | 455/560 |
| 2004/0024635 A1* | 2/2004 | McClure et al. | 705/12 |
| 2004/0128190 A1* | 7/2004 | Campo et al. | 705/12 |
| 2004/0195323 A1* | 10/2004 | Vadura et al. | 235/386 |
| 2004/0217168 A1* | 11/2004 | Cummings | 235/386 |
| 2005/0021479 A1* | 1/2005 | Jorba et al. | 705/67 |
| 2005/0035199 A1* | 2/2005 | Goci et al. | 235/386 |
| 2005/0044413 A1* | 2/2005 | Elms et al. | 713/201 |
| 2005/0065799 A1* | 3/2005 | Dare et al. | 705/1 |
| 2005/0218224 A1* | 10/2005 | Boldin | 235/386 |
| 2005/0263594 A1* | 12/2005 | Onischu | 235/386 |
| 2005/0269406 A1* | 12/2005 | Neff | 235/386 |
| 2005/0284935 A1* | 12/2005 | Sinha | 235/386 |
| 2005/0284936 A1* | 12/2005 | Pazniokas et al. | 235/386 |
| 2005/0288996 A1* | 12/2005 | Wallman | 705/12 |
| 2006/0000904 A1* | 1/2006 | Vernay et al. | 235/386 |
| 2006/0081706 A1* | 4/2006 | Onischuk | 235/386 |
| 2006/0085647 A1* | 4/2006 | Neff | 713/180 |
| 2006/0138226 A1* | 6/2006 | McClure et al. | 235/386 |
| 2006/0169777 A1* | 8/2006 | Colson et al. | 235/386 |
| 2006/0173694 A1* | 8/2006 | Itabashi | 705/1 |
| 2006/0196939 A1* | 9/2006 | Kim et al. | 235/386 |
| 2006/0229991 A1* | 10/2006 | Campagna | 705/50 |
| 2007/0185761 A1* | 8/2007 | Mori et al. | 705/12 |
| 2007/0187498 A1* | 8/2007 | Haas | 235/386 |
| 2007/0241190 A1* | 10/2007 | Hotto et al. | 235/386 |
| 2007/0246534 A1* | 10/2007 | Feldkamp et al. | 235/386 |
| 2008/0000969 A1* | 1/2008 | Salomonsen et al. | 235/386 |
| 2008/0046310 A1* | 2/2008 | Canard et al. | 705/12 |
| 2008/0059791 A1* | 3/2008 | Lee et al. | 713/155 |
| 2008/0105742 A1* | 5/2008 | Kim et al. | 235/386 |
| 2008/0110985 A1* | 5/2008 | Cohen et al. | 235/386 |
| 2008/0135632 A1* | 6/2008 | Haas et al. | 235/50 |
| 2008/0179399 A1* | 7/2008 | Phillips | 235/386 |
| 2008/0243599 A1* | 10/2008 | Kwak | 705/12 |
| 2008/0277470 A1* | 11/2008 | Gallaher et al. | 235/386 |
| 2009/0072030 A1* | 3/2009 | Cardone et al. | 235/386 |
| 2009/0076891 A1* | 3/2009 | Cardone et al. | 705/12 |
| 2009/0106092 A1* | 4/2009 | Bowers | 705/12 |
| 2009/0138343 A1* | 5/2009 | Knowles et al. | 705/12 |
| 2009/0179071 A1* | 7/2009 | Backert et al. | 235/51 |

* cited by examiner

METHOD AND SYSTEM FOR ELECTRONIC VOTING OVER A HIGH-SECURITY NETWORK

TECHNICAL FIELD

The invention relates to a method and a system for electronic voting over a high-security network.

BACKGROUND TO THE INVENTION

Methods and systems for automated voting have been the subject of in-depth studies owing to the psychological, human and political implications which are associated therewith and the technical solutions which allow the problems presented thereby to be overcome.

According to a first type of these methods and systems, the identity of the voter casting his vote is manually controlled. This control affords access to the electronic voting system which then simply has to control the routing of an electronic ballot paper in a reliable manner to a vote counting machine.

A first type mentioned above substantially corresponds to that described by U.S. patent application US 2003208395 in which an electronic ballot paper, constituted, for example, by a mini-application ("applet"), is loaded by the voter casting his vote onto his computer, the operations involved in transmitting the electronic ballot paper, verifying the identity of the voter casting his vote and receiving the electronic ballot paper transmitted thereby being carried out by the same server. The authentication method is of the biometric type.

The method and the system described by the above-mentioned patent application allow the implementation of a powerful authentication process for the voter casting his vote, but at the expense of a physical displacement of the voter. Furthermore, the voter casting his vote cannot be certain that his electronic ballot paper has arrived at its destination, that is to say, at the electronic ballot box.

According to a second type, the methods and systems allow a ballot to be organised, carried out and verified using the INTERNET. Generally, the methods and systems use messages transmitted over the INTERNET, these messages which are referred to as mix-net messages being obtained by means of merging or mixing the data.

A process of this type is described, for example, by patent application EP 1 374 188, in which an improved mix-net is produced.

In the above-mentioned systems, if the merging or mixing modules use techniques, such as effective encryption, it is difficult to certify the integrity of the data at the end of processing. If a means for controlling the integrity of the data is introduced, however, the mixture obtained is reversible, which impairs the level of security and confidentiality of the data transmitted.

According to a third type, the methods and systems use dedicated computers which are provided with powerful authentication means and which are interconnected over a virtual network. This last type provides an optimum level of security based on the process for powerful authentication of the voter casting his vote, authentication certificate level 3, the use of private virtual networks, which is very difficult to take control, and voting terminals.

Patent application U.S. 2002 138341 describes a method and a system which are comparable to those of the third type mentioned above, at least with respect to the use of mix-net messages, a powerful authentication process, by certificate X509, which text file contains signed and encrypted information relating to a physical person, the electronic ballot paper further being encrypted by a hybrid encryption system.

The system described in the above-mentioned document further uses a plurality of servers.

However, the above-mentioned system and method do not provide a satisfactory solution with regard to the criterion of confidence in the administrators of these servers.

In the system and method described in this document, the papers signed electronically by the voter casting his vote pass through a first computer which verifies the electronic signature of the voter and replaces it with a specific signature associated with the first computer before transmitting the electronic ballot paper which has been signed again to the electronic ballot box.

However, this first computer which acts as an intermediary for transactions, or as a trusted third party, maintains any scope, before the electronic ballot paper is introduced into the electronic ballot box, or not, for removing anonymity.

Furthermore, the voter casting his vote receives a blank ballot paper and authentication of the identity of the voter is tantamount to authorisation to vote, without any other control. The encrypted electronic ballot paper is linked to the voter casting his vote, at least at the first computer, and is encrypted with a date.

The dated encryption process mentioned above allows protection against copying of electronic ballot papers which have been intercepted in an illicit manner but, on the other hand, carries the risk that significant aggregation may be carried out.

The problems presented by the use of methods and systems for electronic voting over a network applied to the INTERNET by means of the powerful or weak authentication process can be summarised below.

When, for reasons of hardware costs and logistical complexity of organisation of the ballot, the organisers hold electronic voting via the INTERNET with weak authentication, overall they take risks regarding security of the weak system on at least three levels:

The servers may be victims of service denial. Voters may participate, at times involuntarily, if they are victims of computer viruses, in such malfunctions.

Voters casting their votes are themselves obliged to trust the service providers operating the voting computers with regard to both respecting their anonymity and the integrity of the ballot.

Unscrupulous users may use the code placed on their computer in order to help them place their vote but attempt to undermine the credibility of the vote.

The most basic scheme of the architecture of a system for electronic voting over a network with weak authentication is as follows:

the voter casting his vote is informed of the address of the electronic voting server by any suitable medium (post, e-mail, press . . . );

the voter casting his vote connects, on the day of the vote, from a terminal, of one computer or another, to the voting server using the communicated address for the voting server;

the voting server controls the voting rights of the voter casting his vote, sends a "blank" electronic ballot paper to the voter who fills it in and returns it to the voting server which records or does not record it as a cast vote with the other electronic ballot papers.

The above scheme sets out the risks which are actually encountered on the following levels:

Anonymity: the voter casting his vote must identify himself for his voting right to be verified. If the communications are intercepted and observed, it is possible to find out whom the voter casting his vote is voting for. Therefore, the communications must be encrypted. In order to produce a degree of confidence in the system, independently of the confidence which the voters may place in the administrator of the system, at least two separate servers must be used, a vote administrative server, in order to control the rights to vote and to authenticate the voter casting his vote, and a vote-counting server in order to count the papers.

Only collusion between the administrators of the two servers may allow anonymity to be removed. However, it is indicated that the above-mentioned problems are faced by any authority organising a vote, even one in conventional paper form.

Generally, the majority of multi-server systems are configured in such a manner that the various administrators who may or may not be directly connected to the people having an interest in the results of the vote monitor each other.

Secrecy of the result until the end of the ballot:

Even if the communications are encrypted at network level, if the administrator of the vote-counting server is dishonest, he may know the results before the closure of the ballot. Therefore, it is necessary to carry out encryption at the level of the vote counting application with decryption keys which are not revealed until after the closure of the ballot.

Security:

If the server computers are not adequately protected, a malicious intruder may gain access and cause damage.

Integrity:

The risk of an electronic ballot box becoming jammed is high. The power of the computer hardware and software is such that discovery or disclosure of a malfunction allows anyone aware of this to exploit it on a huge scale.

The use of electronic signatures and certificates allows the above-mentioned risk to be overcome.

Some systems which meet the above-mentioned demands have already been proposed. This is particularly the case for PKI infrastructures which support the use of public key cryptography, owing to systems which generate pairs of public/private keys, in order to allow protection of access to the private key, which is secret by definition and which can be used only by the individual, the voter casting his vote, whose identity has been associated with this private key.

Installing a PKI infrastructure on a large scale, since a ballot can include more than thirty million voters, is currently still difficult and providing an adequate number of secured booths involves significant financial costs.

The systems for electronic voting via the INTERNET are intended to simplify the organisation of ballots and reduce costs and therefore cannot readily use infrastructures of this type.

When, on the other hand, the same organisers use an infrastructure which is highly secured, the cost and the complexity of use are even less suitable for trials and then for generalised use.

Only strong political will, a connection with other organisational developments, such as the electronic identity card, and close collaboration between several concerned parties in the relevant country, which allows these infrastructures to be reused in circumstances which are similar to those of a vote but which are not necessarily connected to this type of event, would allow deployment of an infrastructure of this type to be envisaged.

If, in a situation of this type, these organisers use an electronic voting system which is less secure, the risk of losing the confidence of voters is great, which is by no means acceptable owing to the risk of discrediting these organisers or the political establishment for accepting systems of this type.

The object of the present invention is to overcome all of the disadvantages and limitations of the current methods and systems for electronic voting which in particular force the electorate to trust the technical administrators of the vote.

In particular, the subject-matter of the present invention is a method and system for electronic voting over a network whose structure is capable of ensuring that the responsibilities are distributed between a plurality of administrative parties which, unless there is an illicit agreement between them, cannot undermine the integrity of the ballot without the corresponding fraudulent attempts being uncovered.

Furthermore, the object of the present invention is to provide a simple method and system for voting which do not require the use of a complex authentication system but which do, however, have a high degree of security.

The object of the present invention is also to provide a method and a system which allow protection against any attempt to discredit the voting process, by removing any possibility of attempts to submit, under a given identity, an electronic ballot paper which is signed under another identity in an attempt to create discrepancies between the list of the voters who have actually participated in the vote and the list of voters who have signed a control register.

Finally, the subject-matter of the present invention is the use of a method and system for electronic voting which allow the introduction of a process of eligibility for the voter, who has participated in the vote and has therefore actually voted, to sign the electronic electoral register.

SUMMARY OF THE INVENTION

The method for electronic voting over a high-security network, to which the present invention relates, for a voter who is using a voting terminal which is connected via a network to at least one administrative server and to a vote-counting server is remarkable in that it consists at least in calculating and transmitting from this administrative server to this voting terminal an authentication certificate, in transmitting from this voting terminal to this vote-counting server an electronic ballot paper selected by this voter and an anonymous reference and, upon verification with the true value of this anonymous reference, in validating the electronic ballot paper and the electronic vote of this voter and counting this electronic ballot paper in accordance with the face value thereof, in transmitting from this vote-counting server to this voting terminal a confirmation of receipt in calculating and transmitting from this voting terminal to this administrative server an electoral register document electronically signed by means of said authentication certificate, this administrative server bringing about, upon verification with the true value of the signed electoral register document, the closure of the voting operation for the voter using this voting terminal.

The system for electronic voting over a high-security network for a voter using a voting terminal which is connected via a network to at least one vote-counting server, to which the present invention relates, is remarkable in that it comprises, at least at the level of the administrative server, a module for calculating and transmitting, from the administrative server, to this voting terminal, an authentication certificate, and, at the level of this vote-counting server, a module for receiving and processing a message which is transmitted from this voting terminal and which contains at least one electronic ballot paper selected by this voter and an anonymous reference, a module for verifying with the true value this anonymous reference received, a module for validating the electronic ballot paper and the electronic vote of this voter and a module for counting the vote of this electronic ballot paper in accordance with the face value thereof, and a module for calculating and transmitting to this voting terminal a message of confirmation of receipt.

Another aspect of the invention is an administrative server for electronic voting over a high-security network, for a voter using a voting terminal, comprising at least:
- means for calculating and transmitting to the voting terminal an authentication certificate;
- means for calculating and transmitting an anonymous reference for the using voter;
- means for receiving, from the user terminal, an electronically signed electoral register document; and
- means for verification with the true value of the signed electoral register document, which means are suitable for closing the voting operation of the voter using the voting terminal.

Another aspect of the invention is a server for counting the votes of an electronic vote over a high-security network for a voter using a voting terminal, comprising at least:
- means for receiving and processing a message which is transmitted from the voting terminal and which contains at least one electronic ballot paper selected by this voter and an anonymous reference;
- means for verifying with the true value the anonymous reference received;
- means for validating the electronic ballot paper and the electronic vote of this voter and means for counting the vote of this electronic ballot paper in accordance with the face value thereof;
- means for calculating and transmitting to the voting terminal a message of confirmation of receipt and an electronic electoral register document.

The method and system for electronic voting over a network to which the present invention relates are used to organise political votes, public or private surveys of private individuals under optimum conditions of authenticity and confidentiality with substantially reduced development and/or deployment costs.

BRIEF DESCRIPTION OF DRAWINGS

They will be better understood from a reading of the description and examination of the drawings, in which:

FIGS. 1b and 1c are, by way of illustration, a detailed flow chart for carrying out specific steps of the method to which the present invention relates, as illustrated in FIG. 1a;

DESCRIPTION OF PREFERRED EMBODIMENT

A more detailed description of the method for electronic voting over a high-security network to which the present invention relates will now be given with reference to FIG. 1a and the following Figures.

The method for electronic voting over a network, to which the present invention relates, is carried out between a voter Eu who is using a voting terminal Te connected over a network to at least one administrative server SA and a vote-counting server SCV.

Generally, it is indicated that the voting terminal Te may be constituted by various types of terminal, such as a personal computer connected to the Internet, a specific booth which is installed in a polling station and which is connected to the Internet or a booth in any public place which is also connected to the Internet and in particular to the administrative server SA and the vote-counting server SCV mentioned above, as will be described further in the description.

According to one remarkable aspect of the method to which the present invention relates, it comprises at least a step A for calculating and transmitting, from the administrative server SA to the using voter EU and to the voting terminal Te, an authentication certificate CA and a single-use password dedicated to that voter, this single-use password being designated UPWe.

The calculation and transmission operations of step A are symbolised by the relationship:

$$SA \xrightarrow{[CA, UPWe]} Te$$

Generally, it is indicated that the symbolisation of the data transmitted in the messages that is indicated between brackets as illustrated in the preceding relationship corresponds to a transmission of these data in an encrypted manner with a degree of encryption which will be further explained in the description.

It will of course be appreciated that the single-use password in particular UPWe is transmitted to the using voter Eu and/or to the voting terminal Te in encrypted form in order to prevent any risk of opening and fraudulent use thereof by a third party.

The conditions for calculating and transmitting the authentication certificate CA or the single-use password UPWe will be further explained in the description.

Step A mentioned above is then followed by a step $B_0$ which consists in transmitting from the voting terminal Te to the vote-counting server SCV an electronic ballot paper which is designated EB and which is selected by the using voter Eu, accompanied by an anonymous reference AREu dedicated to this voter.

Figure 1A:
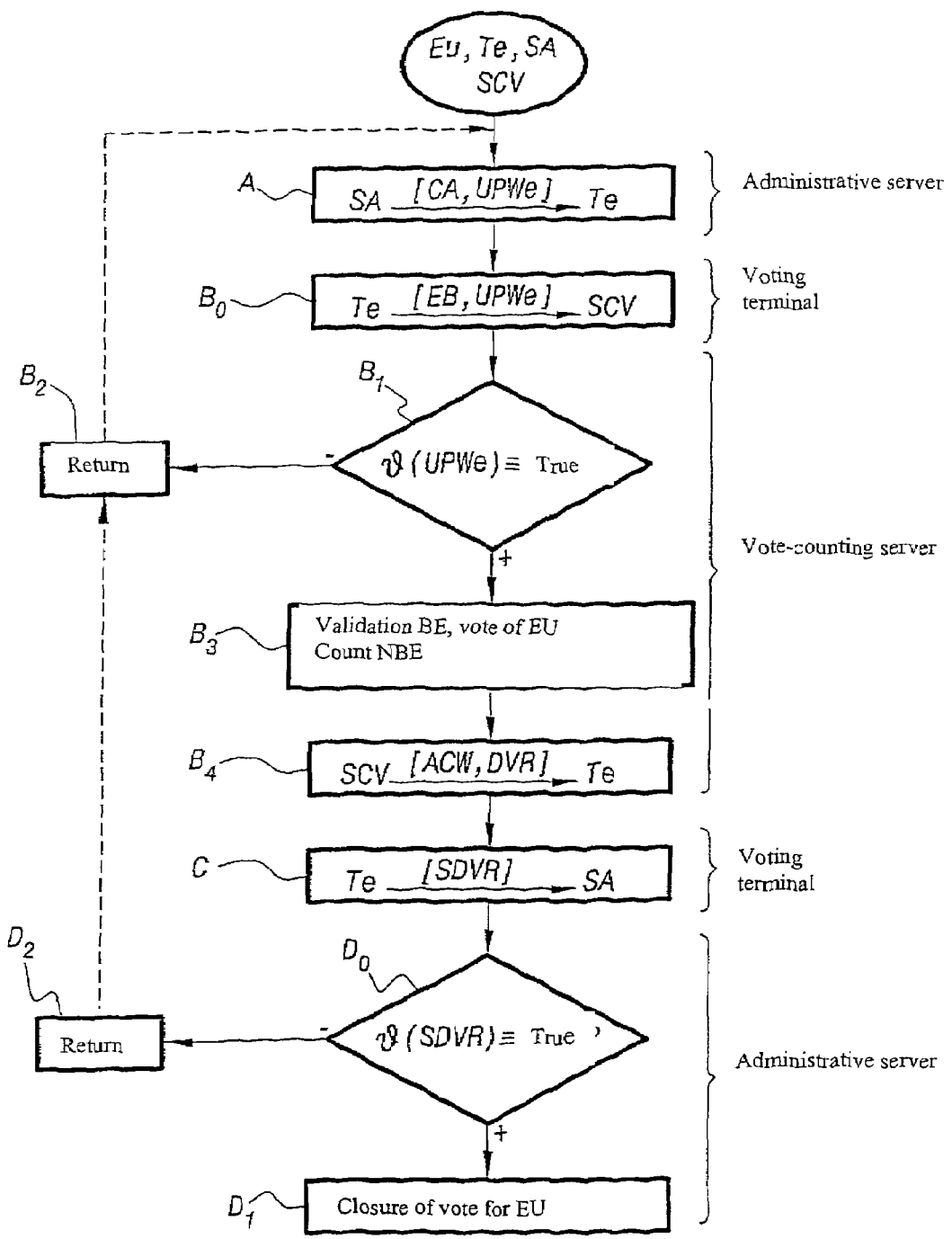
FIG. 1a is, by way of illustration, a flow chart of the steps required for carrying out the method for electronic voting over a network to which the present invention relates.

Step $B_0$ in FIG. 1a illustrates, purely by way of illustration, the transmission by the voting terminal Te of the electronic ballot paper EB and the anonymous reference AREu and the receipt thereof according to the symbolic form:

$$Te \xrightarrow{[EB, AREu]} SCV$$

The transmission operation $B_0$ mentioned above and receipt operation by the vote-counting server SCV is then followed by a step which consists, at the level of the vote-counting server, in verifying with the true value the value of the anonymous reference AREu in step $B_1$.

In the case of a positive response to verification step $B_1$, the method to which the invention relates consists in validating the electronic ballot paper EB and the electronic vote of the using voter Eu in order to count this electronic ballot paper in accordance with the face value thereof.

Conventionally, the face value of the electronic ballot paper may be constituted by a face value which corresponds to a valid paper in accordance with the selection of the using voter, a blank paper or a void paper, for example, according to the conventional exception, associated with the content of the papers.

With reference to FIG. 1a, it is indicated that, in the case of a negative response to the verification test $B_1$, a return step $B_2$ may be provided in order to restart the process at step A and, optionally, to attempt to restart the process for the same electronic terminal Te and the same using voter Eu, but for a limited number of attempts.

Conversely, in the case of a positive response to the verification tests $B_1$, the validation of the electronic ballot paper EB and the electronic vote is illustrated in step $B_3$, this operation making possible the counting of the electronic paper expressed, in accordance with the face value thereof.

Step $B_3$ for validating the electronic paper and the electronic vote may then be followed by a step $B_4$ which consists in transmitting from the vote-counting server SCV to the voting terminal Te a confirmation of receipt ACW and an electronic electoral register document designated DVR.

The electronic electoral register document may be used by the voter as a voting attestation. The electronic electoral register document may equally be used to generate a signed electoral register document used by the administrative server SA to validate the voting operation.

In FIG. 1a the step for transmitting the confirmation of receipt and the electoral register document is denoted in a symbolic manner:

Step $B_4$ may then advantageously be followed by a step C which consists in calculating and transmitting from the voting terminal Te to the administrative server SA an electoral register document electronically signed by the user, this document being designated SDVR. The electronically signed electoral register document is obtained, for instance, by signing the electronic electoral register document provided by the vote-counting server SCV. Preferably, the signature is provided through the authentication certificate.

The transmission operation from the voting terminal Te to the administrative server SA is denoted in a symbolic manner:

Following receipt of the electronically signed electoral register document SDVR, the administrative server SA then carries out a step $D_0$ for verifying with the true value the signed electoral register document SDVR. This operation is denoted in a symbolic manner:

v(*SDVR*)=true.

In the case of a negative response to test $D_0$, a step $D_2$ for returning to step A may be carried out in order to effect one or more new voting attempts granted to the using voter Eu, but whose number is limited.

Conversely, in the case of a positive response to test $D_0$ for verification with the true value of the signed electoral register document, the administrative server SA brings about the closure of the voting operation for the voter Eu using the voting terminal Te.

The method for electronic voting over a high-security network to which the present invention relates appears to be particularly remarkable in that the single-use password UPWe may be calculated as a unique value for each using voter Eu.

After the closure of the vote of Eu or after returning at steps $B_2$ and $D_2$ to step A at the administrative server, the server carries out the deletion of the single-use password and, for example, the destruction of the password.

Figure 1B:
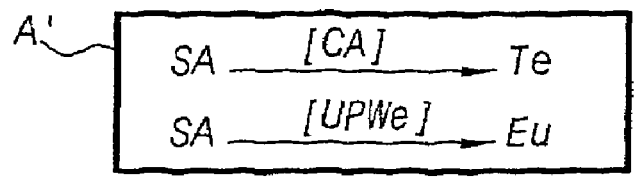

According to one particularly advantageous aspect of the method to which the invention relates, as illustrated in FIG. 1b, the operations which consist in calculating and transmitting, from the administrative server SA to the voting terminal Te and the using voter Eu, an authentication certificate CA or a single-use password UPWe linked to this voter are preferably not simultaneous.

The non-simultaneous nature of the two above-mentioned operations is illustrated in FIG. 1b by the successive symbolic relationships:

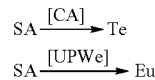

The non-simultaneous nature of the above-mentioned transmission operations allows a reduction in the risk of interception of a single message and in particular the risk of the single-use password UPWe being associated with the authentication certificate CA which are not transmitted simultaneously.

Of course, step A in FIG. 1a can be carried out in conventional manner, the above-mentioned step which consists in calculating and transmitting from the administrative server SA to the voting terminal Te the authentication certificate CA then the single-use password UPWe advantageously being carried out upon request for authorisation to participate in the vote by the using voter Eu from the voting terminal Te.

The above-mentioned authorisation request comprises at least personal identification data of the voter Eu and the authentication certificate is calculated and transmitted upon verification with the true value of the personal identification data by the administrative server.

Figure 1C:
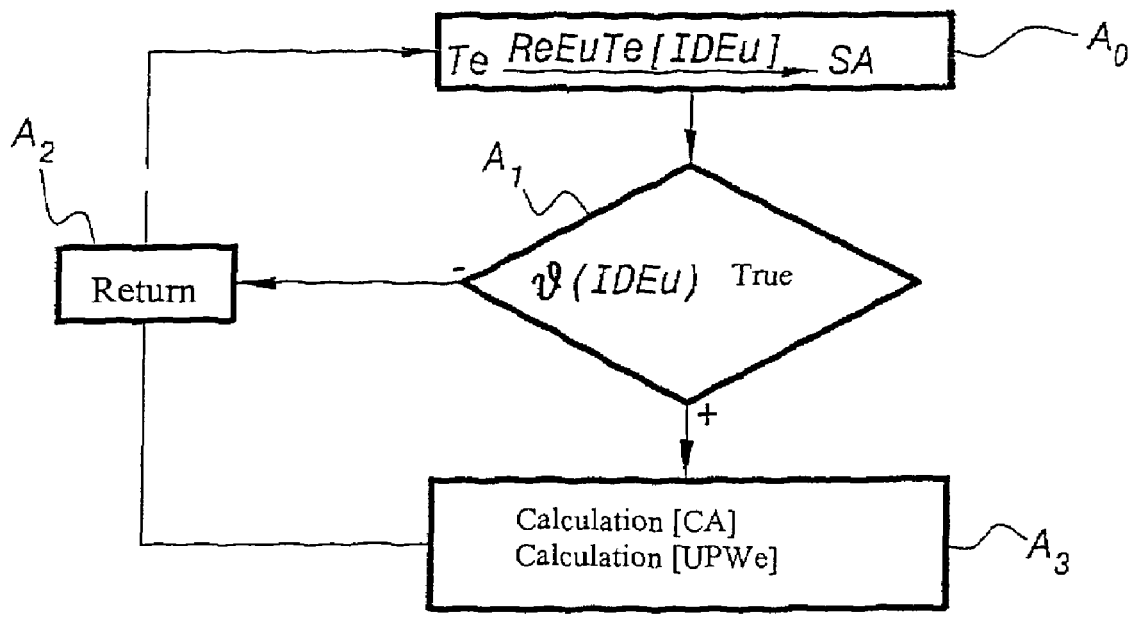

The corresponding operations are illustrated in FIG. 1c in which step $A_0$ designates and illustrates in a symbolic manner the transmission of the request according to the symbolic relationship:

The administrative server SA then carries out a test step $A_1$ for verification with the true value of the user identification data IDEu, after decryption thereof, of course.

In the case of a negative response to test step $A_1$, a return $A_2$ to step $A_0$ may be provided for, this return operation being comparable to the return operations $B_2$ and $D_2$ illustrated in FIG. 1a.

Conversely, in the case of a positive response to test step $A_1$, the personal identification data IDEU of the using voter being verified with the true value, the operation for calculating the authentication certificate CA then for calculating the single-use password UPWe can then be carried out in step $A_3$.

As illustrated in FIG. 1c, the operations which consist in calculating and transmitting the single-use password UPWe which is dedicated to the voter Eu and the operation for transmitting it are carried out conditionally upon verification with the true value of the personal identification data IDEu of the using voter Eu by the administrative server SA.

Furthermore, this operation is preferably carried out following the transmission of the authentication certificate CA in accordance with the implementation method illustrated in step A' which is a variant of step A in FIG. 1b.

Figure 2:
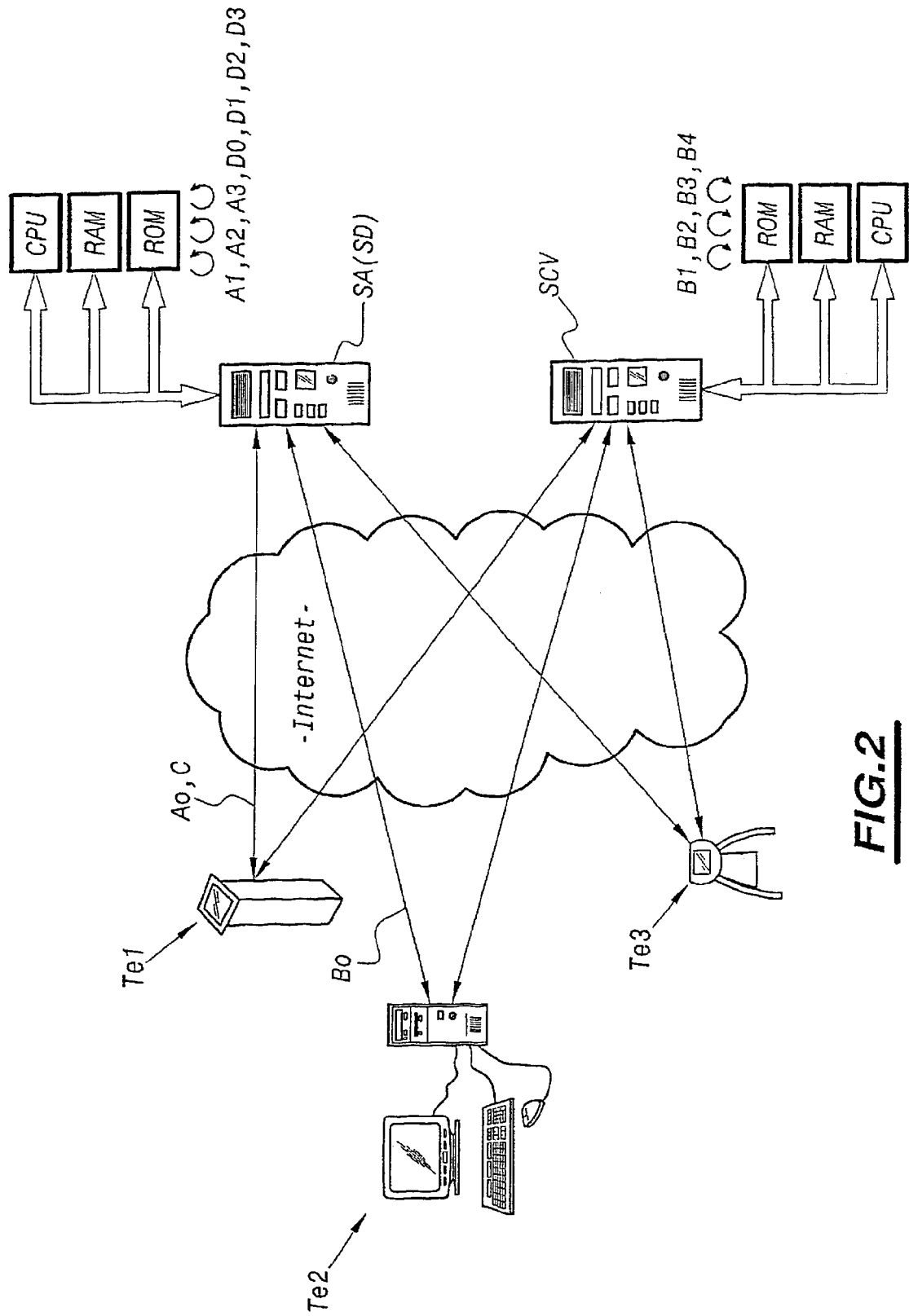
FIG. 2 is, by way of illustration, a general diagram of an architecture of a system for electronic voting over a network in accordance with the subject-matter of the present invention.

An architecture comprising various types of voting terminal $Te_1$, $Te_2$, $Te_3$, which are interconnected via the Internet to an administrative server SA and a vote-counting server SCV is schematically illustrated in FIG. 2.

In FIG. 2 mentioned above, the method steps for electronic voting in accordance with the subject-matter of the present invention are illustrated carried out at the level of each of the above-mentioned parties.

By way of non-limiting example, it is indicated that the voting terminal $Te_1$ may be constituted by a dedicated booth in a polling station, the voting terminal $Te_2$ may be constituted by a personal computer installed at the home of an individual using voter and the voting terminal $Te_3$ may be constituted by a booth installed in a public place which is not dedicated specifically to a vote.

The operations are carried out in accordance with the method to which the invention relates, from the two servers, the administrative server SA and the vote-counting server SCV, as mentioned and described above in the description.

The method and the system for electronic voting over a high-security network to which the present invention relates allow, by a single-use password being used, a high level of security to be obtained with regard to holding the vote with complete integrity and no risk at all of fraud by third parties.

However, in order to protect against any risk of manipulation and/or fraud which may be carried out by a body responsible for the organisation of the vote, the system to which the present invention relates and the corresponding method may be carried out, in a particularly advantageous manner, from a dedicated server which has at least the function of calculating and transmitting the single-use password, this dedicated server being independent from the actual administrative server and the vote-counting server described above with reference to FIG. 2.

Of course, the dedicated server calculates one single-use password UPWe, and only one, associated with the using voter.

Figure 3:
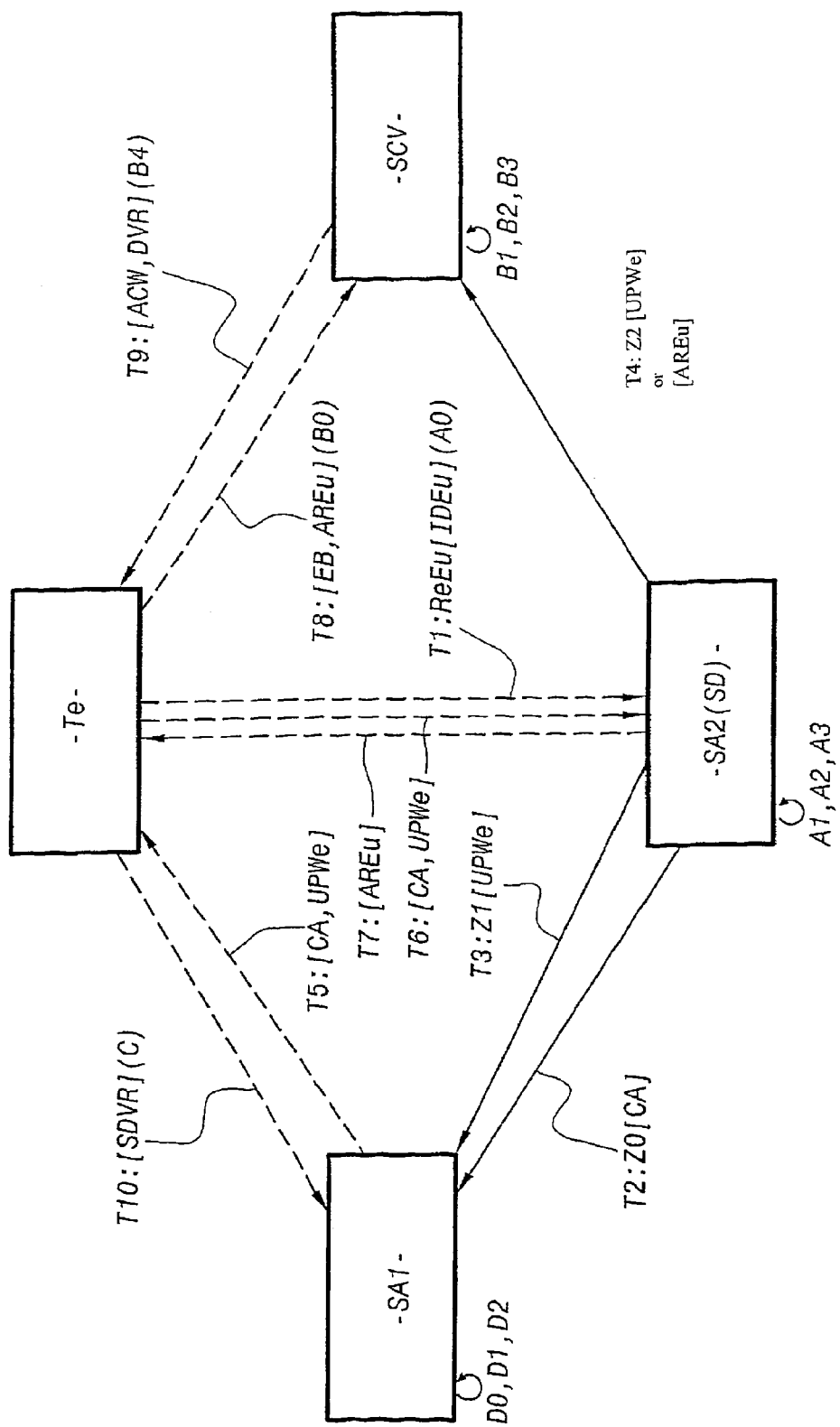
FIG. 3 is, by way of illustration, an architecture, in the form of block diagrams, according to a preferred variant of a system for electronic voting over a network in accordance with the subject-matter of the present invention.

FIG. 3 illustrates a corresponding architecture for a system for electronic voting over a high-security network in accordance with the subject-matter of the present invention comprising in particular a dedicated server SD which is independent from the administrative server and the vote-counting server.

Generally, it is indicated that, in order to implement the architecture illustrated in FIG. 3, in which the calculation and the transmission of the single-use password are carried out from a dedicated server, it is possible to consider so to speak splitting the administrative server SA illustrated in FIG. 2 into a first administrative server SAL and a second administrative server $SA_2$ which acts as the dedicated server SD, being the only one authorised to calculate and transmit and process the single-use password UPWe.

It will be appreciated in particular that the first administrative server $SA_1$ and the second server $SA_2$ acting as a dedicated server can therefore be assigned clearly defined respective tasks which will be explained below.

As illustrated in FIG. 3, the dedicated server $SA_2$ (SD), the second administrative server, can advantageously carry out steps $A_1$, $A_2$, $A_3$ illustrated in FIGS. 1a and 1c with, in addition to the calculation, the transmission and processing of the single-use password UPWe for which only this server is authorised.

The first administrative server $SA_1$ can therefore be dedicated to the actual administration of the electoral lists and the control of the closure of the vote, for example, in order to carry out operations $D_0$, $D_1$ and $D_2$ illustrated in FIG. 1a.

According to a particularly remarkable aspect of the system for electronic voting over a high-security network to which the invention relates, it is indicated that the exchanges of messages between each administrative server, the first administrative server $SA_1$, second administrative server $SA_2$ acting as a dedicated server SD, and the vote-counting server SCV, are each carried out following a successful authentication protocol with a very high level of security, illustrated by an arrow shown as a solid line between these parties.

The authentication protocol used may correspond, by way of non-limiting example, to a zero-knowledge authentication protocol, the various messages which are of course transmitted in encrypted form between the first administrative server, the second administrative server acting as a dedicated server and the vote-counting server SCV being encrypted with a very high level of security, but transmitted following the successful authentication operation mentioned above.

Finally, the transactions or exchanges of messages between the voting terminal Te, or each electronic terminal $Te_1$ to $Te_3$ illustrated in FIG. 2 and the first administrative server $SA_1$, the second administrative server $SA_2$ and the vote-counting server SCV are illustrated by dot-dash arrows which illustrate transactions via encrypted messages with a high-security level of encryption.

The succession of steps carried out by the method for electronic voting over a network, to which the invention relates and which is illustrated in FIGS. 1a to 1c, is set out below according to the time and spatial references between the various parties, the voting terminal Te, first administrative server $SA_1$, second administrative server $SA_2$ which acts as the dedicated server SD and the vote-counting server SCV.

T1: ReEu[IDEu]
T2: $Z_0$[CA]
T3: $Z_1$[UPWe]
T4: $Z_2$[AREu]
T5: [CA, UPWe]
T6: [CA, UPWe]
T7: [AREu]
T8: [EB,UPWe]
T9: [ACW,DVR]
T10: [SDVR]

In the table above, it should be noted that all the transactions $Z_0$ to $Z_2$ between the administrative server and the vote-counting server designate the transmission of an encrypted message, the transaction between these elements having satisfied a successful powerful authentication protocol, as mentioned above in the description.

This in particular ensures the independence and the integrity of the transactions between the various parties which are completely or partially subjected to the authority of an administrator of the vote.

Finally, with regard to the operations for transmitting, from the administrative server and in particular from the second administrative server $SA_2$ acting as an SD server to the voter Eu and to the voting terminal Te, the authentication certificate and the single-use password UPWe to this voter, it is indicated that the operations may, in a particularly advantageous manner, be carried out by means of separate transmission channels.

With regard to the transmission of the authentication certificate CA, as illustrated in step A' of FIG, 1b in particular, it is indicated that the above-mentioned transmission may be carried out via the Internet network following the transmission of the request for authorisation to vote in step $T_1$ illustrated in the table of the electronic terminal Te to the dedicated server, the second administrative server $SA_2$.

Conversely, the transmission of the single-use password UPWe may be carried out via a completely separate transmission channel, such as, for example, a messaging service, an e-mail or optionally a letter sent by name to the using voter Eu prior to the date of the vote.

In particular, it is indicated that the transmission of the single-use password by means of a short message, referred to as SMS, may advantageously be envisaged since the using voter Eu has in this case, for example, a mobile telephone, access to which is protected by the identification code of the device which only the using voter controls.

When the transmission of the single-use password UPWe to the user terminal Te or to the using voter Eu has been carried out, T5: [CA, UPWe], the using voter Eu connects, on the day of the vote, to the second administrative server $SA_2$ (SD), the dedicated server, T6: [CA, UPWe] in order to present his authentication certificate CA and his single-use password UPWe. The second administrative server $SA_2$ (SD), the only one authorised to process the single-use password UPWe, carries out, after verification of the pair CA, UPWe, the calculation of an anonymous reference AREu for the using voter which is transmitted T7: [AREu] to the voting terminal Te.

The anonymous reference AREu for the using voter may comprise a numerical value obtained from a hash function, as will be described further in the description. The anonymous reference is preferably in accordance with the single-use password. But the anonymous reference may also be obtained independently of the single-use password.

The user terminal Te then connects to a vote-counting server SCV and transmits to this server T8: [EB, AREu] the electronic ballot paper EB thereof and the anonymous reference AREu for the using voter. The process is continued following operations for validating the ballot paper and the vote by the operations for transmitting a confirmation of receipt and electoral register document T9: [ACW,DVR] then for transmitting the signed electoral register document SDVR via the transaction T10: [SDVR] from the voting terminal Te to the first administrative server $SA_1$.

A more detailed description of the operating method for an architecture of a system for electronic voting over a network which is in accordance with the subject-matter of the present invention and which comprises a dedicated server which is more particularly intended to bring about the calculation and control of a single-use password will now be given with reference to FIGS. 4a and 4b.

Figure 4A:
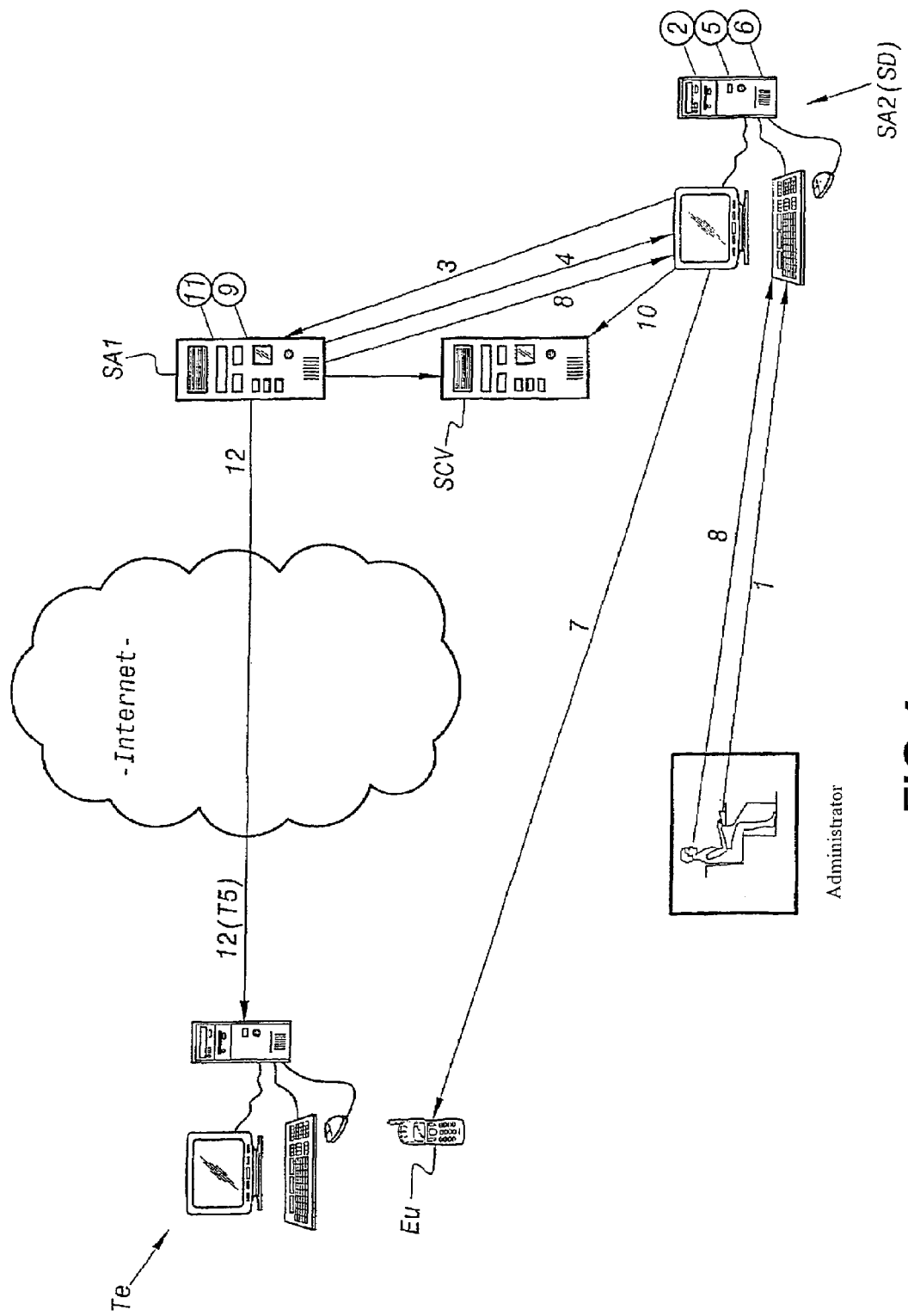
FIG. 4a is, by way of illustration, a detail for carrying out an electronic voting session by a user using an electronic voting system in accordance with the subject-matter of the present invention as illustrated in FIG. 3.

In FIG. 4a mentioned above, it is indicated that the using voter Eu is supposed to have a mobile telephone terminal and an electronic terminal Te, such as a personal computer connected to the Internet, for example.

The administrative server $SA_1$ substantially acts as an electoral list server, the second administrative server $SA_2$ acts as a dedicated server SD and the vote-counting server SCV is interconnected to the first and second administrative servers, as mentioned above in the description with reference to FIG. 3.

Preferably, as illustrated in FIG. 4a, the system for electronic voting over a network to which the invention relates comprises, at the level of one of the administrative servers $SA_1$ or $SA_2$, a module for calculating and transmitting, from this administrative server to the voter Eu and to the voting terminal Te, an authentication certificate CA and a single-use password UPWe dedicated to this voter.

With reference to FIG. 4a and FIG. 3, it is indicated that the above-mentioned calculation module is implanted at the level of the second administrative server acting as a dedicated server SD which allows the implementation of the operations $A_0, A_1, A_2, A_3$ illustrated in FIG. 1a and indicated in the table above.

The system to which the invention relates comprises, at the level of the vote-counting server SCV, a module for receiving and processing a message which is transmitted by the voting terminal Te and which contains at least the electronic ballot paper EB selected by this voter and the anonymous reference AREu for the using voter which is, for instance, in accordance with the single-use password UPWe and which is dedicated to this voter. This receiving module corresponds to the reception by the vote-counting server, being a message transmitted at step $B_0$ of FIG. 1a by the voting terminal Te.

The vote-counting server SCV further comprises a module for verification with the true value of the anonymous reference AREu for the using voter and consequently the dedicated single-use password received.

This module corresponds to the implementation of step $B_1$ of FIG. 1a, it being understood that this module carries out the above-mentioned verification by means of comparison, for example, of the anonymous reference AREu for the using voter or the single-use password UPWe transmitted by the second administrative server acting as a dedicated server SD to the vote-counting server SCV and the anonymous reference AREu transmitted previously by the voting terminal Te to the vote-counting server SCV.

The vote-counting server also comprises a module for validating the electronic ballot paper EB and the electronic vote of this voter associated with a module for counting the vote of this electronic ballot paper, as mentioned above in the description in accordance with the face value of this electronic ballot paper. The above-mentioned modules correspond to the implementation of step $B_3$ of FIG. 1a and FIG. 3.

Finally, the vote-counting server SCV comprises a module for calculating and transmitting to the voting terminal Te a message of confirmation of receipt and an electronic electoral register document, which operation is carried out at step $B_4$ of FIG. 1a and FIG. 3.

A preferred operating method of the protocol for exchanging messages and transactions between the various parties, the first administrative server $SA_1$, second administrative server $SA_2$ acting as a dedicated server SD, vote-counting server SCV and voting terminal Te will now be given with reference to FIG. 4a and FIG. 4b.

Generally, with reference to FIG. 4a, it is indicated that the administrative server, in particular the second administrative server $SA_2$ acting as the dedicated server comprises at least one module for storing data representing the list of ballots, the list of applicants for these ballots linked to one or more districts.

This operation is carried out at 1 under the authority of the organisers of the vote who are referred to as Administrator and who can update the dedicated server $SA_2$.

The dedicated server $SA_2$ comprises a module for calculating, carried out at 2, a group of mini-applications in the form of lists, these mini-applications MA being known as "applets". A mini-application is associated with a district and contains the list of applicants and the encryption keys for the electronic ballot papers.

In particular, it should be understood that the electronic ballot papers EB, which are illustrated between brackets during their transmission, are, of course, encrypted using the above-mentioned encryption keys with a high level of security. The high level of security is understood to be hard encryption using encryption keys having non-symmetrical keys, for example, in accordance with the RSA algorithm or the like.

The second administrative server $SA_2$ acting as a dedicated server further comprises a module for transmitting the mini-applications which contain the list of applicants and the encryption keys to the first administrative server $SA_1$.

After signature by the second administrative server $SA_2$, the first administrative server $SA_1$ receives at 3 the list of mini-applications, carries out the compilation thereof, and publishes the list of applicants for verification.

To this end, the first administrative server $SA_1$ naturally comprises a module for storing the list of mini-applications, a module for compiling the mini-applications and signing the compiled mini-applications, and a module for extracting and publishing the list of applicants for each district and each mini-application, and a module for transmitting the signed mini-applications to the second administrative server $SA_2$, a dedicated server SD and to the voting terminal for each voter concerned.

In particular, it is understood that the first administrative server $SA_1$ sends at 4 the application list of the signed mini-applications to the second administrative server, the dedicated server SD.

The dedicated server mentioned above then verifies at 5 the integrity of the signed mini-applications by means of verification of the signature and upon authorisation transmitted by the second server, the dedicated administrative server SD, to the first administrative server, this server then being capable of transmitting to each voter concerned the verified original mini-applications which have not been able to be replaced by modified mini-applications.

With regard to controlling the single-use passwords UPWe, it is indicated that the second administrative server $SA_2$, the dedicated server SD, produces at 6 the group of single-use passwords mentioned above.

The dedicated server SD then transmits at 7 the single-use password UPWe to the using voter Eu concerned, as described above in the description with reference to FIG. 3, for example.

With regard to the above-mentioned control of the encryption keys, it is indicated that the first administrative server $SA_1$ receives, from the authorities responsible for the system, that is to say, the administrators controlling the overall system, the list of public encryption keys which allows the encryption which is intended to prevent the disclosure of the electronic papers EB before the end of the ballot. The encryption keys mentioned above are transmitted with each mini-application MA to each of the voting terminals Te concerned.

Finally, control of the authentication keys is regulated for the use of the authentication certificates by the first administrative server $SA_1$ and the second administrative server $SA_2$ acting as a dedicated server SD.

The two servers mentioned above produce a list of authentication keys designated LKA for the authentication keys produced by the dedicated server SD and LKB produced by the first administrative server $SA_1$, respectively.

Each using voter Eu is thus assigned a pair of authentication keys KA produced by the dedicated server SD, the second administrative server, and KB produced by the first administrative server $SA_1$, respectively.

Each of the servers $SA_1$ and $SA_2$, and the dedicated server SD produces a list of authentication keys LKB and LKA which it has produced.

The first administrative server $SA_1$ which has produced the list of authentication keys LKB transmits at 9, to the dedicated server SD, pairs of values formed by the identity of the voter or an identity code linked to the voter and a hash function for the authentication key KB which is associated therewith.

The dedicated server SD calculates the hash function of the keys of the list of keys LKA and pairs the hash function HKB for the authentication keys KB received with the hash function for the corresponding authentication key KA.

It then carries out at 10 the transmission of only the pairs of values for the hash function HKA, HKB to the vote-counting server without any association with the identity code of the using voter Eu.

With regard to the control of the authentication certificates, this is carried out according to a PKI architecture as mentioned above in the description.

To this end, the first administrative server $SA_1$ produces at 11 a list of indispensable certificates so that only the authorised using voters Eu are allowed to participate in the vote.

The first administrative server $SA_1$ produces and controls a revocation list for the above-mentioned certificates.

It should be understood in particular that, following the transaction $T_2$ illustrated in FIG. 3, for example, when the first administrative server has received the authentication certificate CA, the first administrative server mentioned above constructs a list which allows it to grant permission for only the authorised voters to participate in the vote.

The first administrative server $SA_1$ then transmits at 12, to each voter, his authentication certificate in accordance with the transaction $T_5$ illustrated in FIG. 3.

The using voter Eu is then in a position to install the authentication certificate CA on his voting terminal Te.

The transactions carried out by the using voter and by the overall system on the day of the vote will now be explained with reference to FIG. 4b.

On the day of the vote, the using voter Eu connects at 13 to the dedicated server $SA_2$ (SD). He transmits his single-use password UPWe and the information which allows it to be authenticated. The second administrative server $SA_2$ (SD) interrogates a database which provides it with the authentication key KB which has been associated with this using voter.

When several ballots take place on the same day, a plurality of authentication keys KB will be available by means of diversification for the same voter Eu.

In this situation, the dedicated server $SA_2$ (SD) is then in a position to interrogate a plurality of vote-counting servers (SCV) corresponding to each election.

If the above-mentioned connection attempt designated $C_{13}$ fails, owing to an authentication error, the authentication process for the using voter Eu, based on his authentication certificate, not having been able to be carried out successfully, a control process is activated and the event is then traced in order to implement anti-fraud security procedures, for example.

This operation may correspond to an operation which is launched from the return $A_2$ of FIG. 1c in the event of a negative response to the identification of the using voter.

When there is no authentication error, the second dedicated administrative server $SA_2$ (SD) transmits at 14 the authentication key KA to the vote-counting server SCV. The vote-counting server SCV then carries out a control $C_{14}$ in the database thereof in order to verify that this key KA has not already been used. If this key KA has been used, as illustrated in FIG. 4b, the voter is alerted by the vote-counting server SCV via the dedicated server $SA_2$ (SD) that he no longer has the right to participate in the vote for this ballot.

In particular, in the event of an authentication error, that is to say, when the authentication key KA has already been used, the event is traced at $C_{14}$, the using voter Eu being supposed to have attempted to vote twice.

The controller or the control element contacts the first administrative server $SA_1$ in order to verify that the signature is present.

When there is no error, the vote-counting server SCV transmits at 15, to the second dedicated administrative server $SA_2$ (SD), the authorisation to vote. The authentication key KA is still preserved in the valid keys of the vote-counting server SCV.

The dedicated server $SA_2$ (SD) transmits at 16, to the using voter Eu, that is to say, to the voting terminal Te, a voting mini-application MA and the authentication key KA.

It should be noted that the voting mini-application and the authentication key KA have been produced during the preparations for the vote. After the mini-application MA and the authentication key KA have been received, the voting terminal Te brings about a connection 17 to the first administrative server $SA_1$. The navigator of the voting terminal Te then presents a challenge that the authentication certificate CA which has been distributed beforehand and which is installed on this terminal beforehand allows to be overcome owing to the PKI system and certificates produced.

The voter selects his applicant or list of applicants using the electronic paper EB and the voting terminal Te then carries out a process of blind signature using the mini-application MA. This obscures the electronic paper EB which has been encrypted beforehand using a process of the steganographic type and transmits at 17 the entirety to the first administrative server $SA_1$. If the connection attempt fails at the first administrative server $SA_1$, these failed attempts are listed and traced at C17, an authentication error at the level of the first administrative server $SA_1$ is then traced and transmitted to the control element or controller. This may decide not to process the vote requests originating from specific sources, that is to say, specific terminals Te, for a given length of time.

When there is no authentication error, the using voter signs the electoral register using his private key and transmits the signed register at 18 to the first administrative server $SA_1$.

The first administrative server SA, sends at 19 the blind signature corresponding to the obscured paper and the authentication key KB to the terminal Te of the using voter Eu. The mini-application MA then reveals the paper and allows the valid signature to be obtained from the electronic paper EB which has been revealed but which is still encrypted. The authentication key KB held by the using voter and the electronic terminal Te is proof that the electoral register has been signed.

The mini-application MA installed on the voting terminal Te of the using voter Eu is connected at 20 to the vote-counting server SCV and transmits the group formed by the encrypted electronic paper EB, the blind signature, the authentication key KA and the authentication key KB.

The vote-control server SCV then carries out a control $C_{20}$ of the signature which must be that of the first administrative server SA, and the authentication key KB which must be valid.

The criterion of validity consists in the fact that the hash function pair for the authentication keys KA and KB, that is to say, the pairs HKA and HKB must be part of the pairs which are not used and which are known.

The vote-counting server SCV then stores the encrypted electronic paper EB and the blind signature in a database whilst awaiting evaluation. It stores in another database the pair of authentication keys KA, KB as proof that it has received the original of one of the pairs of authorised authentication keys.

Figure 4B:
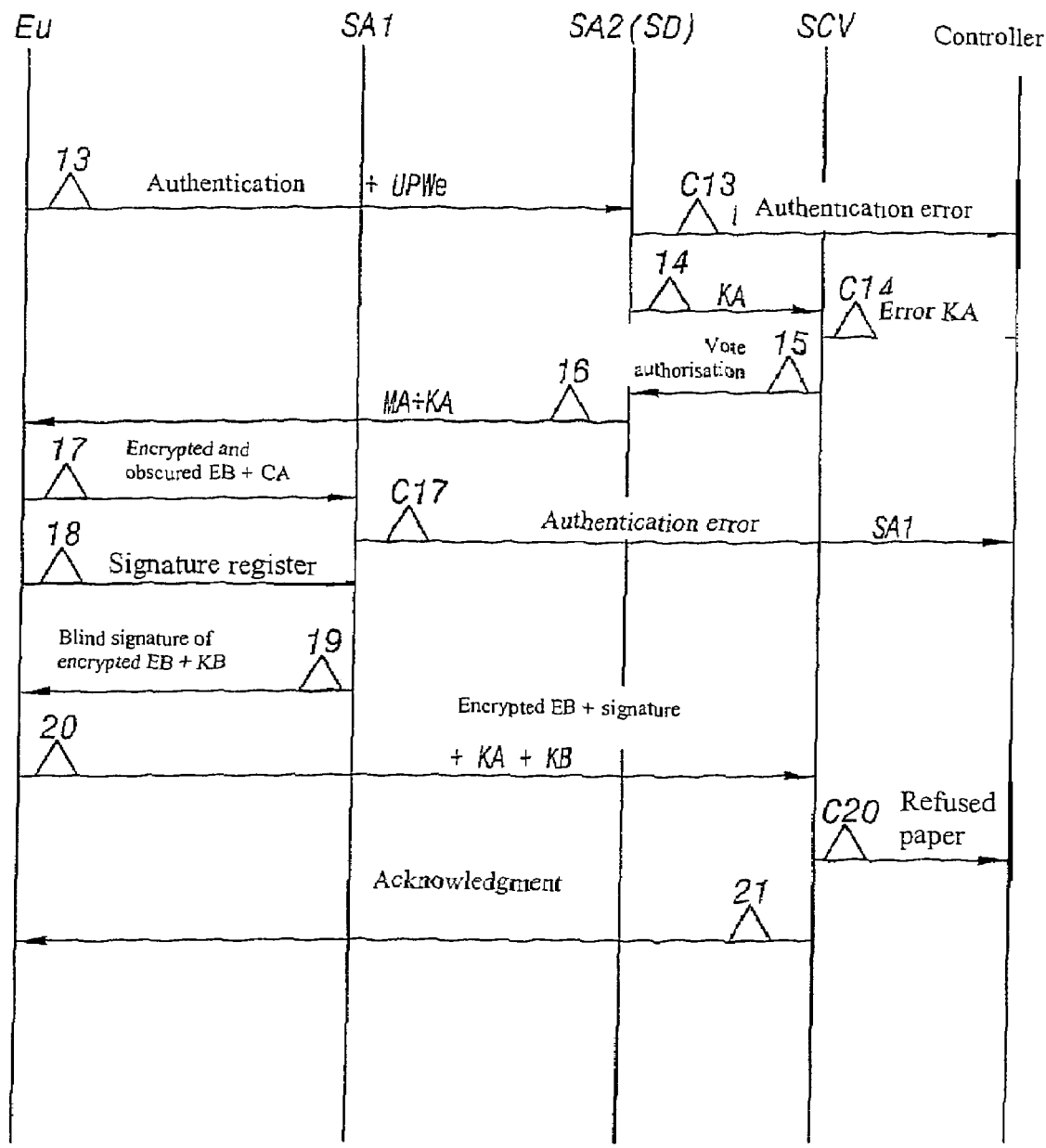
FIG. 4b is, by way of illustration, a detail for carrying out a succession of steps or a protocol by means of the architecture of an electronic voting system as illustrated in FIG. 3.

In the case of a non-verification error in the control chain carried out by the vote-control server SCV described above, the above-mentioned vote-control server transmits at $C_{20}$ a notification of ballot paper refusal to the control element, as illustrated in FIG. 4b.

Conversely, when all the controls have been successfully carried out by the vote-counting server SCV, it alerts the using voter Eu that his paper has been counted.

A mechanism for anonymous transmission can therefore be put in place.

In FIG. 4b and with reference to FIG. 4a, it is indicated that the procedure for signing the electoral register at 18 and 19 is made possible by the authentication process by means of the authentication keys KA and KB which are produced separately by the first administrative server $SA_1$ and the second administrative server $SA_2$.

Under these conditions, the vote-counting server thus appears as an arbitrator which allows, following step 20 for transmitting the keys KA and KB, the integrity of the vote to be verified and the vote to be carried out independently by the three independent bodies constituted by the first administrative server $SA_1$, the second dedicated administrative server $SA_2$ (SD) and the vote-counting server SCV.

The invention claimed is:

1. A method for electronic voting over a high-security network, for a voter using a voting terminal connected via a network to at least one administrative server and to a vote-counting server, the method further comprising:

calculating and transmitting from the administrative server to the voting terminal an authentication certificate; and transmitting from the voting terminal to the vote-counting server an electronic ballot paper selected by the voter and an anonymous reference; and, upon verification of the anonymous reference against a true value of the anonymous reference at the vote counting server, validating the electronic ballot paper and the electronic vote of the voter and counting the electronic ballot paper in accordance with the voter selected ballot paper;

transmitting from the vote-counting server to the voting terminal a confirmation of receipt; and calculating and transmitting from the voting terminal to the administrative server an electoral register document signed electronically by a private key, the administrative server bringing about, upon verification of said signature against a true signature value of the signed electoral register document at the administrative server, the closure of the voting operation for the voter using the voting terminal.

2. The method according to claim 1, further comprising an operation which consists in transmitting an electronic electoral register document from said vote-counting server to said voting terminal.

3. The method according to claim 2, further comprising calculating and transmitting from the administrative server to said voter a single-use password, the transmission of said single-use password not being simultaneous with the transmission of said authentication certificate.

4. The method according to claim 3, wherein the operation which consists in calculating and transmitting an authentication certificate is carried out upon request for authorization to participate in the vote by the using voter from the voting terminal, the authorization request comprising at least personal identification data of the voter, the authentication certificate being calculated and transmitted upon verification with true value of the personal identification data by the administrative server.

5. The method according to claim 4 wherein the operations which consist in calculating and transmitting a single-use password dedicated to the voter are carried out conditionally upon verification with the true value of the personal identification data by the administrative server and following the transmission of the authentication certificate.

6. The method according to claim 3, wherein the operation which consists in calculating and transmitting a single-use password is carried out from a dedicated server independent from the administrative server and the vote-counting server, the dedicated server calculating one single-use password, and only one, associated with the voter.

7. The method according to claim 6, wherein the exchanges of messages between the administrative server, the vote-counting server and the dedicated server are carried out between each of them following a successful zero-knowledge authentication protocol.

8. The method according to claim 1, wherein the transmission of an authentication certificate and a single-use password dedicated to the voter is carried out by means of separate transmission channels.

9. A system for electronic voting over a high-security network for a voter using a voting terminal which is connected via a network to at least one administrative server and a vote-counting server, the system further comprising:
at the level of the administrative server,
means for calculating and transmitting from the administrative server to the voting terminal an authentication certificate;
means for receiving, from the voting terminal, an electoral register document electronically signed by a private key at the voting terminal, means for verifying the electronically signed electoral register document against a true signature value, the electronically signed electoral register document; and means for closing the voting operation of the voter using the voter terminal upon verification of the signed electoral register document, and
at the level of the vote-counting server
means for receiving and processing a message which is transmitted from the voting terminal and which contains at least one electronic ballot paper selected by the voter and an anonymous reference;
means for verifying, with the true value, the anonymous reference received;
means for validating the electronic ballot paper and the electronic vote of the voter and means for counting the vote of the electronic ballot paper in accordance with the voter selected ballot paper;
means for calculating and transmitting to the voting terminal a message of confirmation of receipt.

10. A first administrative server for electronic voting over a high-security network, for a voter using a voting terminal, comprising:
means for calculating and transmitting to the voting terminal an authentication certificate;
means for receiving, from the voting terminal, an electoral register document electronically signed by means of a private key;
means for verifying against a true signature value at the first administrative server, the electronically signed electoral register document; and
means for closing the voting operation of the voter using the voting terminal upon verification with the voter selected value of the signed electoral register document,
means for forming a pair of authentication keys allocated to each voter using a voting terminal, said pair of authentication keys comprising:
a first authentication key produced by a second administrative server, a dedicated server independent from the first administrative server; and
a second authentication key produced by the first administrative server,
wherein the first administrative server producing a list of second authentication keys and transmitting to the second administrative server, data pairs formed by a voter identity value for a voter applying to vote, and by a hash value for the second authentication key associated with that voter.

11. The first administrative server according to claim 10, further comprising:
means for storing the list of mini-applications;
means for compiling the mini-applications and for signing the compiled mini-applications;
means for extracting and publishing the list of applicants for each voting district and each mini-application;
means for transmitting the signed mini-applications to the second administrative server, and to the voting terminal for each voter concerned,
wherein each applicant corresponds to a voter.

12. The first administrative server according to claim 10, further comprising:
means for storing public keys which allow the transmitted messages to be merged and encrypted, in particular electronic ballot papers, in order to ensure the confidentiality thereof, the public keys being transmitted with the mini-applications.

13. The first administrative server according to claim 10, wherein the first administrative server further comprising:
means for calculating a list of authentication certificates in order to authorize only the identified voters to participate in the vote; and
means for controlling a revocation list for the authentication certificates; and
means for transmitting to the voting terminal the authentication certificate associated with the identified applicant voter using the voting terminal.

14. The first administrative server according to claim 10, comprising means for controlling the electoral lists, in accordance with voting districts and the applicants for the ballot.

15. A second administrative server for electronic voting over a high-security network, for a voter using a voting terminal, the second administrative server being a dedicated server independent from a first administrative server and a vote-counting server, wherein the second administrative server comprises:

means for forming a pair of authentication keys allocated to each voter using a voting terminal, said means for forming said pair of authentication keys receiving a first authentication key produced by the second administrative server; and by a second authentication key produced by the first administrative server, wherein the second administrative server generates a list of first authentication keys and carrying out a pairing operation of a hash value of the second authentication key received from the first authentication server with the first authentication key produced by the second administrative server and calculates a hash value of the first authentication key and transmits a pair formed by the hash value of the first and second authentication key to the vote-counting server.

16. The second administrative server according to claim 15, further comprising means for calculating one single-use password, and only one, associated with the voter and for transmitting said single-use password to the voter.

17. The second administrative server according to claim 16, further comprising:

coding means which allow said single-use password to be protected by means of a code.

18. The second administrative server according to claim 15, further comprising at least:

means for storing data representing the list of ballots, the list of applicants for these ballots, connected to one or more voting districts;

means for calculating a group of mini-applications in the form of a list, a mini-application being associated with a voting district and containing the list of applicants and the encryption keys of the electronic ballot papers;

means for transmitting the mini-applications to the first administrative server.

* * * * *